(12) United States Patent
Valkaitis

(10) Patent No.: US 11,606,196 B1
(45) Date of Patent: Mar. 14, 2023

(54) AUTHENTICATION SYSTEM FOR A MULTIUSER DEVICE

(71) Applicant: UAB 360 IT, Vilnius (LT)

(72) Inventor: Mindaugas Valkaitis, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/830,277

(22) Filed: Jun. 1, 2022

(51) Int. Cl.
*H04L 9/08* (2006.01)
(52) U.S. Cl.
CPC ............ *H04L 9/0825* (2013.01); *H04L 9/085* (2013.01); *H04L 9/0866* (2013.01)
(58) Field of Classification Search
CPC ...... H04L 9/0825; H04L 9/085; H04L 9/0866
See application file for complete search history.

(56) References Cited

U.S. PATENT DOCUMENTS

| | | | | | |
|---|---|---|---|---|---|
| 2002/0136410 | A1* | 9/2002 | Hanna | ..................... | H04L 9/088 380/277 |
| 2014/0095870 | A1* | 4/2014 | Dewan | ..................... | G06F 21/32 713/167 |
| 2015/0026461 | A1* | 1/2015 | Devi | ..................... | H04L 9/0894 713/165 |
| 2015/0113279 | A1* | 4/2015 | Andersen | ............ | G06F 21/6218 713/171 |
| 2019/0052467 | A1* | 2/2019 | Bettger | ................. | H04L 9/0861 |

* cited by examiner

*Primary Examiner* — Philip J Chea
*Assistant Examiner* — Sangseok Park
(74) *Attorney, Agent, or Firm* — The Pattani Law Group

(57) ABSTRACT

A method including decrypting, by a user device based at least in part on utilizing a master key, an assigned private key associated with the user device; decrypting, by a user device based at least in part on utilizing a trusted key, a double-encrypted symmetric key to determine a single-encrypted symmetric key; decrypting, by the user device based at least in part on utilizing the assigned private key, the single-encrypted symmetric key to determine a symmetric key; and decrypting, by the user device based at least in part on utilizing the symmetric key, an encrypted folder stored on the user device to provide access to data included in the encrypted folder. Various other aspects and techniques are contemplated.

19 Claims, 6 Drawing Sheets

AUTHENTICATION SYSTEM FOR A MULTIUSER DEVICE

FIELD OF DISCLOSURE

Aspects of the present disclosure generally relate to use of computer hardware and/or software for communications, and in particular to providing an authentication system for a multiuser device.

BACKGROUND

Various methods of cryptography (e.g., encrypting and decrypting data) are known. Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. Encoded/encrypted data may be decoded/decrypted with a given decryption key. In an example, symmetric cryptography may utilize encryption and decryption algorithms that rely on a single private key for encryption and decryption of data. Symmetric cryptography is considered to be relatively speedy. One example of an encryption and decryption algorithm utilized by symmetric encryption may be an AES encryption cipher. On the other hand, asymmetric cryptography may utilize encryption and decryption algorithms that rely on two separate but mathematically-related keys for encryption and decryption of data. For instance, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

SUMMARY

In one aspect, the present disclosure contemplates a method including decrypting, by a user device based at least in part on utilizing a master key, an assigned private key associated with the user device; decrypting, by a user device based at least in part on utilizing a trusted key, a double-encrypted symmetric key to determine a single-encrypted symmetric key; decrypting, by the user device based at least in part on utilizing the assigned private key, the single-encrypted symmetric key to determine a symmetric key; and decrypting, by the user device based at least in part on utilizing the symmetric key, an encrypted folder stored on the user device to provide access to data included in the encrypted folder.

In another aspect, the present disclosure contemplates a device comprising a memory and a processor communicatively coupled to the memory, the processor being configured to: decrypt, based at least in part on utilizing a master key, an assigned private key associated with the user device; decrypt, based at least in part on utilizing a trusted key, a double-encrypted symmetric key to determine a single-encrypted symmetric key; decrypt, based at least in part on utilizing the assigned private key, the single-encrypted symmetric key to determine a symmetric key; and decrypt, based at least in part on utilizing the symmetric key, an encrypted folder stored on the user device to provide access to data included in the encrypted folder.

In another aspect, the present disclosure contemplates a non-transitory computer readable medium storing instructions, which when executed by a processor cause the processor to: decrypt, based at least in part on utilizing a master key, an assigned private key associated with the user device; decrypt, based at least in part on utilizing a trusted key, a double-encrypted symmetric key to determine a single-encrypted symmetric key; decrypt, based at least in part on utilizing the assigned private key, the single-encrypted symmetric key to determine a symmetric key; and decrypt, based at least in part on utilizing the symmetric key, an encrypted folder stored on the user device to provide access to data included in the encrypted folder.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
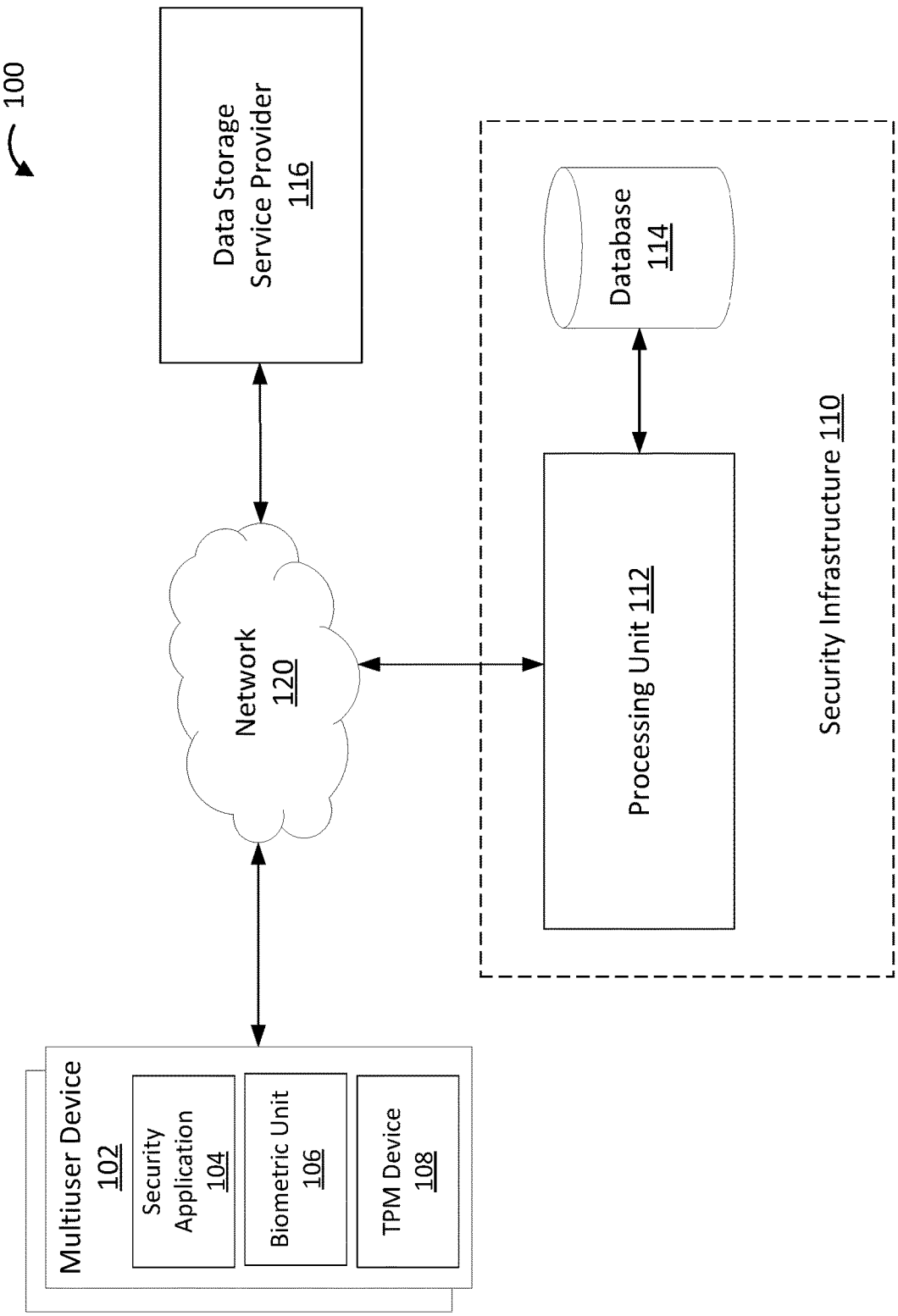

FIG. 1 is an illustration of an example system associated with an authentication system for a multiuser device, according to various aspects of the present disclosure.

Figure 2:
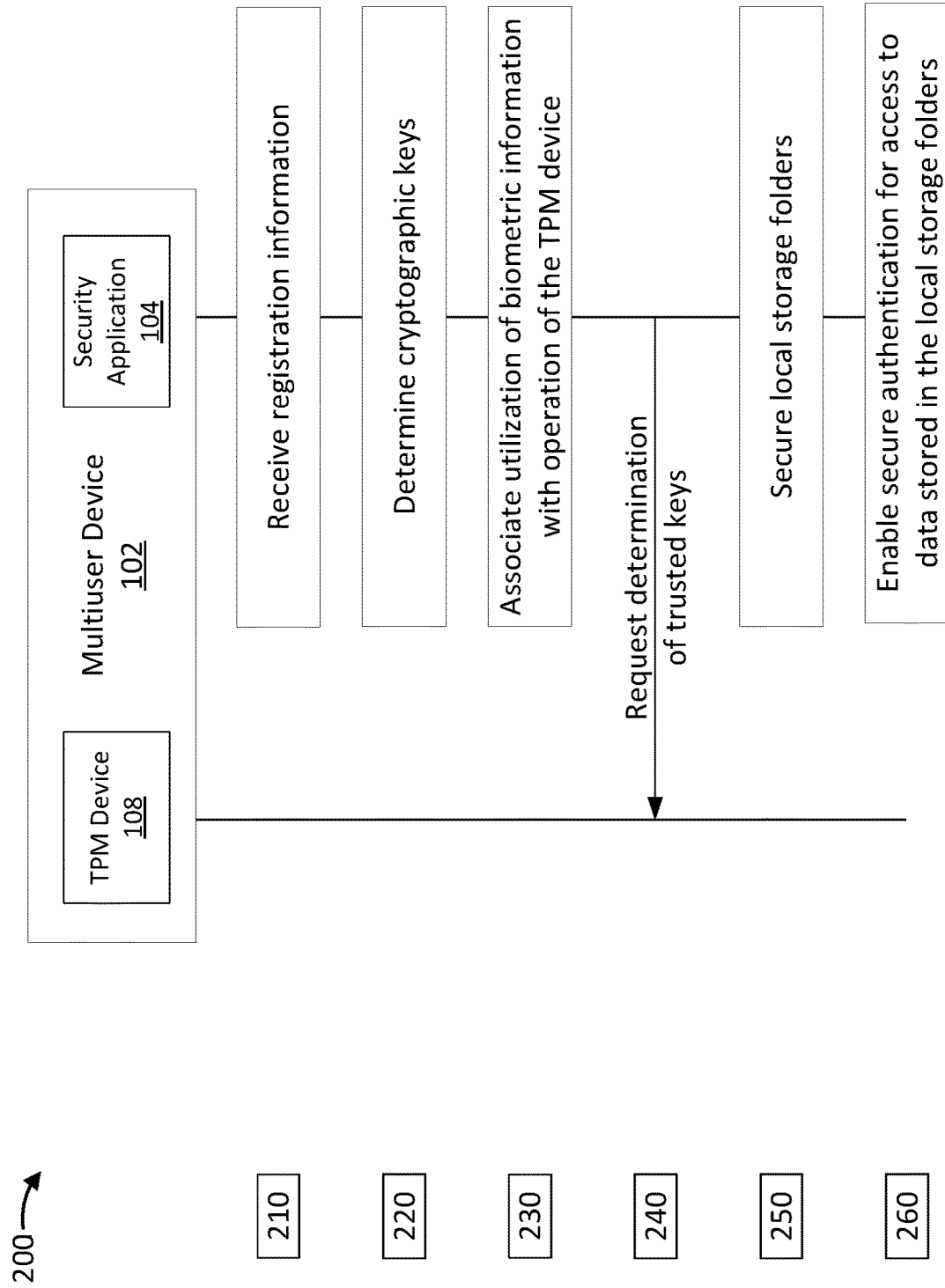

FIG. 2 is an illustration of an example flow associated with an authentication system for a multiuser device, according to various aspects of the present disclosure.

Figure 3:
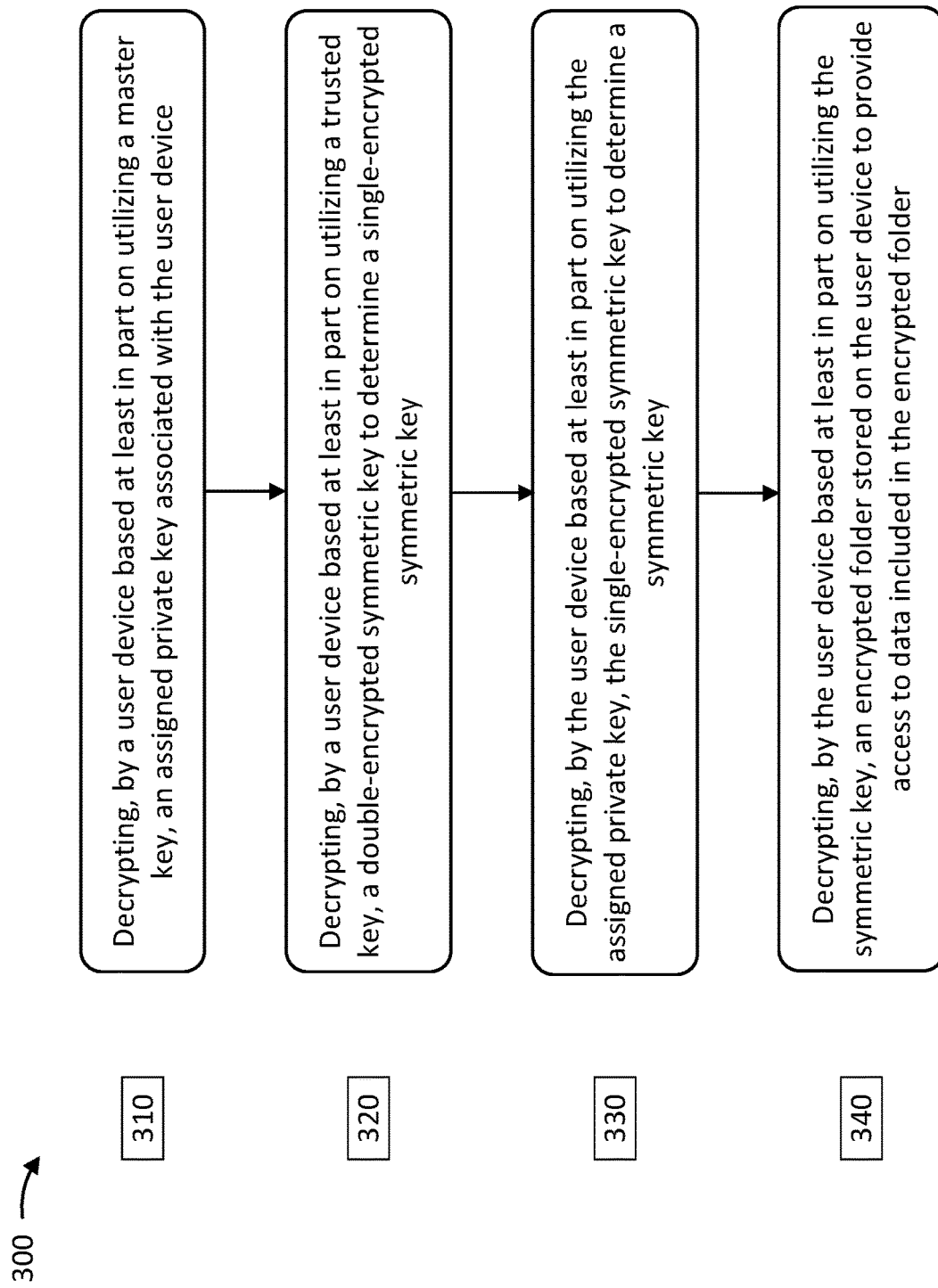

FIG. 3 is an illustration of an example process associated with an authentication system for a multiuser device, according to various aspects of the present disclosure.

Figure 4:
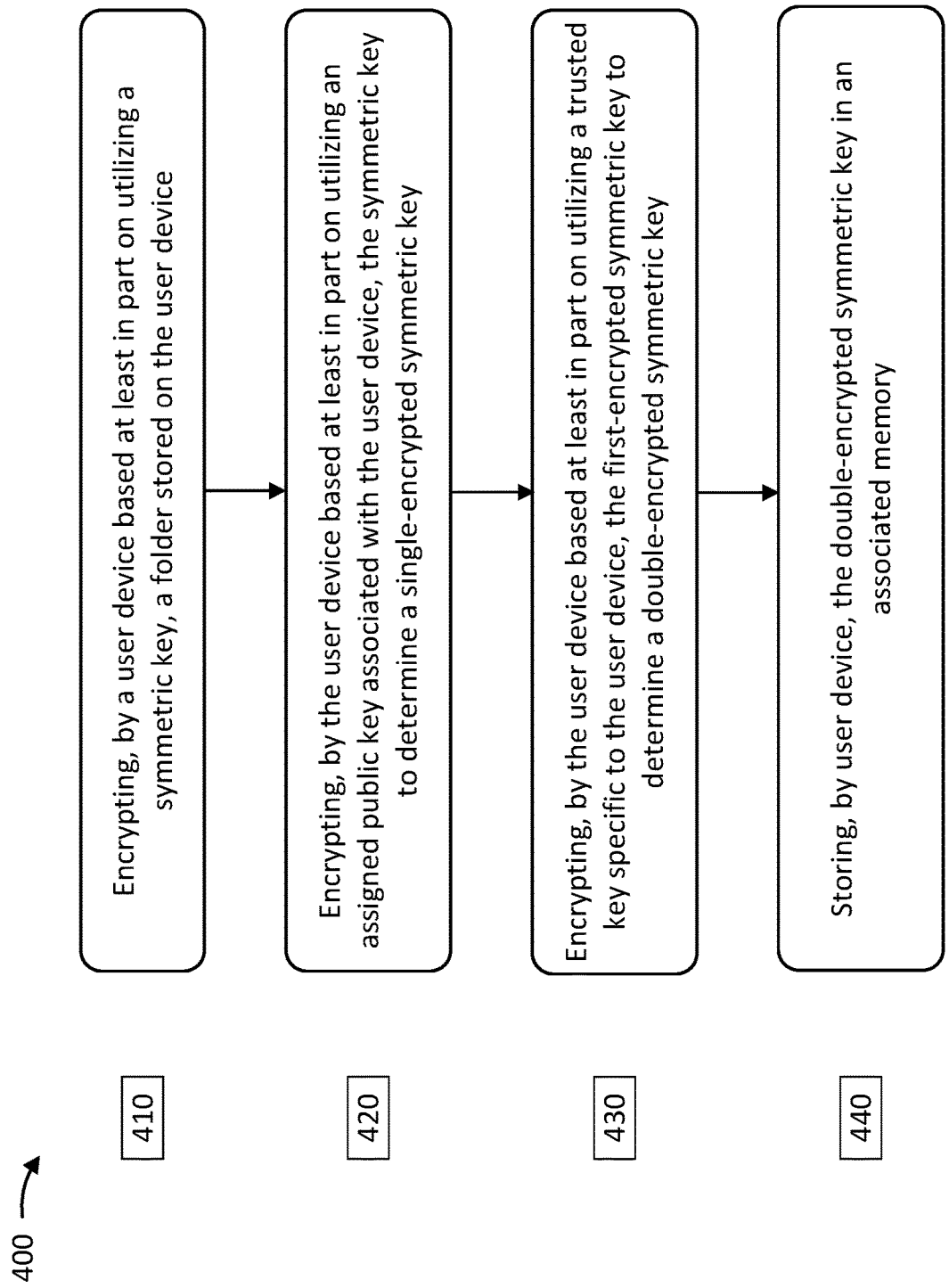

FIG. 4 is an illustration of an example process associated with an authentication system for a multiuser device, according to various aspects of the present disclosure.

Figure 5:
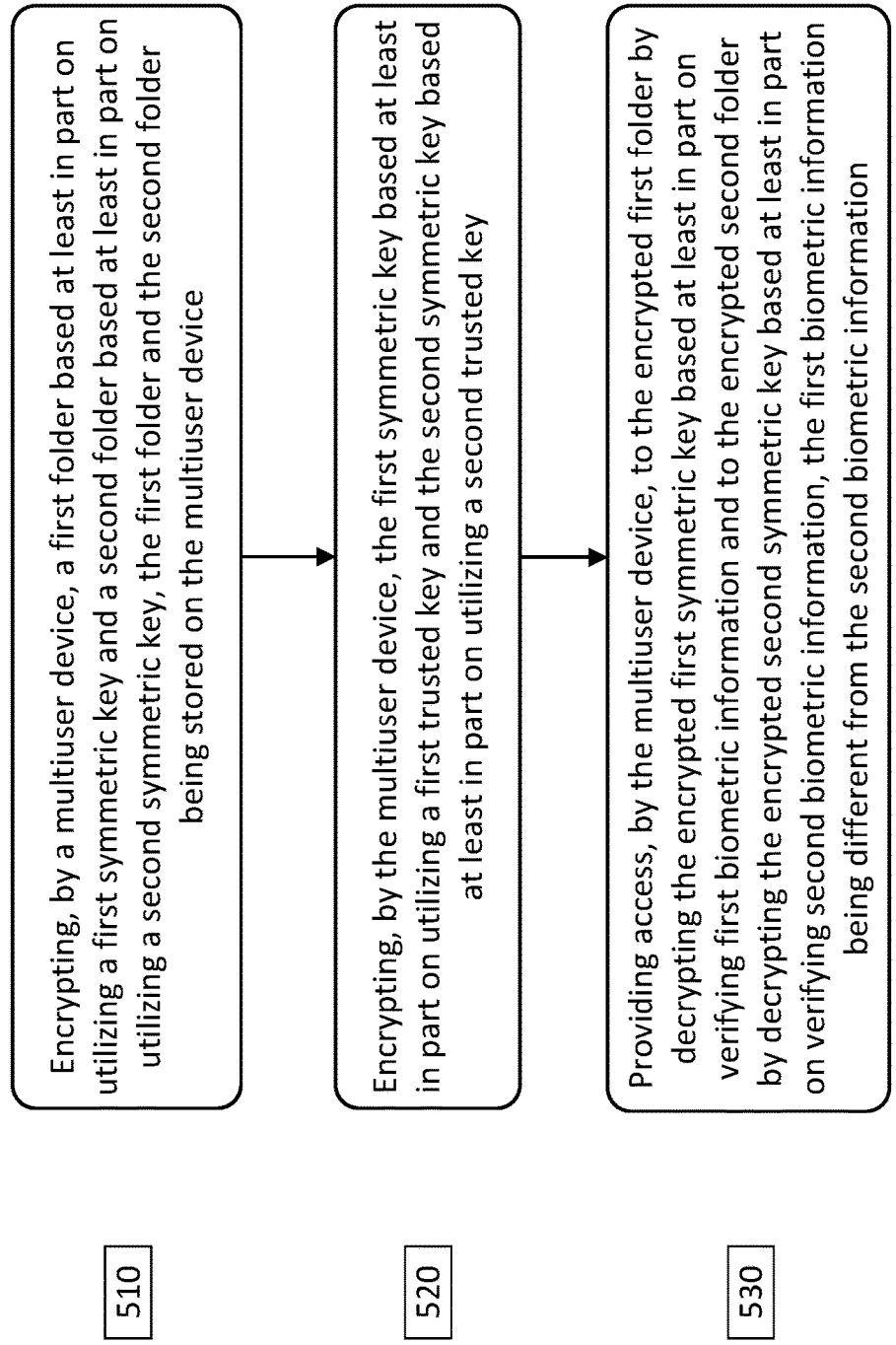

FIG. 5 is an illustration of an example process associated with an authentication system for a multiuser device, according to various aspects of the present disclosure.

Figure 6:
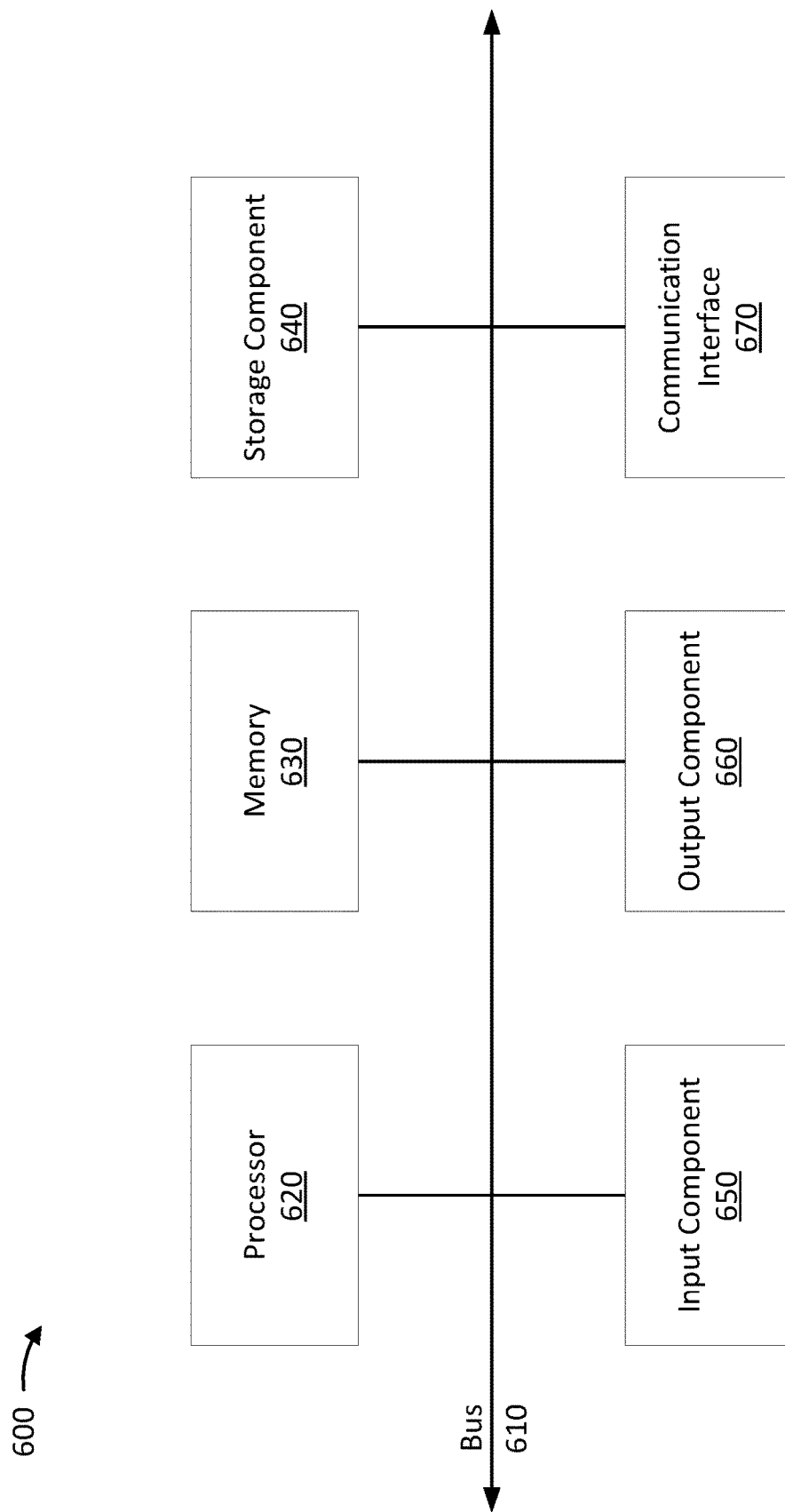

FIG. 6 is an illustration of example devices associated with an authentication system for a multiuser device, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with an authentication system for a multiuser device, according to various aspects of the present disclosure. The system 100 includes a multiuser device 102, a security infrastructure 110, and a DSSP 116 communicating with each other over a network 120. In some aspects, the multiuser device 102 and the DSSP 116 may communicate with one another for purposes of obtaining and/or providing network services. The network services may include any service provided over a network (e.g., Internet) such as, for example, data storage and protection services. In some aspects, the multiuser device 102 and the security infrastructure 110 may communicate with one another for purposes of obtaining and/or providing cyber security services. As discussed in detail with respect to FIG. 2, the cyber security services may include, for example, an authentication service during which the security infrastructure 110 enables secure authentication for access to data stored in a local storage on the multiuser device 102.

In some aspects, the multiuser device 102 may be accessible by multiple users. The multiuser device 102 may include and/or be associated with a security application 104, a biometric unit 106, and a trusted platform module (TPM) device 108 communicatively coupled to an associated processor (e.g., processor 620) and/or memory (e.g., memory 630). In some aspects, the associated processor and/or memory may be local to the multiuser device 102. In some aspects, the associated processor and/or memory may be located remotely with respect to the multiuser device 102. The security infrastructure 110 may include a processing unit 112 and a database (e.g., memory) 114. The security infrastructure 110 may configure and provide the security application 104 for installation to enable the multiuser device 102 to communicate with an application programming interface (API) (not shown) included in the security infrastructure 110 and/or for obtaining the cyber security services.

The multiuser device 102 may be a physical computing device capable of hosting the security application 104 and of connecting to the network 120. The multiuser device 102 may be, for example, a laptop, a mobile phone, a tablet computer, a desktop computer, a smart device, a router, or the like. In some aspects, the multiuser device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The multiuser device 102 may include and/or may be associated with a communication interface to communicate (e.g., receive and/or transmit) data.

In some aspects, the security infrastructure 110 may configure and provide the multiuser device 102 with the security application 104 to be installed on the multiuser device 102. As discussed with respect to FIG. 2, the security application 104 may be configured to enable utilization of cryptographic keys, the biometric unit 106, and/or the TPM device 108 by (an operating system of) the multiuser device 102 to enable secure authentication for access to data stored in a local storage on the multiuser device 102. The security application 104 and/or the security infrastructure 110 may utilize one or more encryption and decryption algorithms to encrypt and decrypt data. The encryption algorithms and decryption algorithms may employ standards such as, for example, data encryption standards (DES), advanced encryption standards (AES), Rivest-Shamir-Adleman (RSA) encryption standard, Open PGP standards, file encryption overview, disk encryption overview, email encryption overview, etc. Some examples of the security algorithms include a triple data encryption standard (DES) algorithm, Rivest-Shamir-Adleman (RSA) encryption algorithm, advanced encryption standards (AES) algorithms, Twofish encryption algorithms, Blowfish encryption algorithms, IDEA encryption algorithms, MD5 encryption algorithms, HMAC encryption algorithms, etc.

The biometric unit 106 may enable identification, authentication, and/or access control. In some aspects, the biometric unit 106 may include a biometric sensor for sensing and/or capturing biometric information associated with a user. Such biometric information may include, for example, fingerprint, palm print, finger shape, palm shape, voice, retina, iris, face image, sound, dynamic signature, blood vessel pattern, keystroke, or a combination thereof. The biometric unit 106 may utilize the associated processor to correlate the captured biometric information with user information associated with an authorized user, and to store a correlation of the biometric information with the user information in the associated memory. Further, the biometric unit 106 may enable comparison of a received biometric information with stored biometric information to verify and/or authenticate that the received biometric information is associated with the user information (e.g., that the received biometric information belongs to the authorized user).

The TPM device 108 may include a dedicated controller utilizing integrated cryptographic keys (e.g., master keys) and/or cryptographic algorithms to operate as a secure crypto processor. The TPM device 108 may carry out cryptographic operations, embedded in a packaging with multiple physical security measures, which give it a degree of tamper resistance. In some aspects, the TPM device 108 may refrain from communicating the cryptographic keys (e.g., master keys, etc.) and/or the cryptographic algorithms externally (e.g., external to the TPM device 108).

The security infrastructure 110 may include the processing unit 112 and the database 114. The processing unit 112 may include a logical component configured to perform complex operations to evaluate various factors associated with providing the cyber security services. The database 114 may store various pieces of information associated with providing the cyber security services, including security algorithms, encrypted content, and/or encryption/decryption key information. The security infrastructure 110 may include or be associated with a communication interface (e.g., communication interface 670) to communicate (e.g., transmit and/or receive) data.

The DSSP 116 may own and operate an infrastructure associated with providing the data storage and protection services. To access the data storage and protection services, the DSSP 116 may enable the multiuser device 102 to set up an authentication system. Upon communication of credentials by the multiuser device 102, the DSSP 116 may authenticate the credentials and provide the multiuser device 102 with access to the data storage and protection services when the credentials are successfully authenticated.

The network 120 may be wired or wireless network. In some aspects, the network 120 may include one or more of, for example, a phone line, a local-area network (LAN), a wide-area network (WAN), a metropolitan-area network (MAN), a home-area network (HAN), Internet, Intranet, Extranet, and Internetwork. In some aspects, the network 120 may include a digital telecommunication network that permits several nodes to share and access resources.

As indicated above, FIG. 1 is provided as an example. Other examples may differ from what is described with regard to FIG. 1.

A user device may receive data storage services from a data storage service provider (DSSP). Such data storage services may include cloud storage services that enable the user device to utilize, for example, the Internet to store data in a cloud storage (e.g., servers and/or storage devices) managed by the DSSP. The data storage services may also be referred to as cloud backup services, online data storage services, online drive storages, file hosting services, file storage services, or the like. The DSSP may attempt to protect the stored data by requiring the user device to provide credentials (e.g., username, password, one-time passwords, one-time tokens, or the like) to gain authorized access to the data stored in the cloud storage. The cloud storage may be accessible via use of a client interface (e.g., a web interface and/or an application interface).

As part of the data storage services, the DSSP may enable the user device to synchronize the cloud storage with a local storage on the user device such that the data stored in the cloud storage is also stored in the local storage. In this case, upon synchronization, the user device may access the data via the local storage when, for example, the user device is unable to connect to the Internet or a server associated with the cloud storage may be out of service.

Such accessing of data via the local storage may result in private information becoming compromised. In an example, the user device may be a multiuser device accessible by multiple users. For instance, a first user and a second user may have access to the multiuser device. In this case, the first user may synchronize a first cloud storage with a first local storage, which may store first private data associated with the first user. Similarly, the second user may synchronize a second cloud storage with a second local storage, which may store second private data associated with the second user. As a result, the first user may access the second private data stored in the second local storage via access to the multiuser device, thereby compromising the second private data. Similarly, the second user may access the first private data stored in the first local storage via access to the multiuser device, thereby compromising the first private data.

As a result, an integrity associated with the first private data and/or the second private data may be compromised. To restore the integrity, the multiuser device and/or the DSSP may expend resources (e.g., management resources, memory resources, computational/processing resources, power consumption resources, system bandwidth, network resources, financial resources, time resources, etc.) that may otherwise be utilized to perform more suitable tasks.

In some cases, the first user and the second user may utilize the same credentials to access the multiuser device. In other cases, the first user and the second user may utilize different credentials to access the multiuser device. The first private data and/or the second private data may include, for example, personal and/or sensitive information such as contact information (e.g., name, address, telephone number email address, etc.), financial information (e.g., bank account numbers, etc.), access information (e.g., account information, username, password, etc.), literature information (e.g., documents, files, photographs, etc.), or a combination thereof.

Various aspects of systems and techniques discussed in the present disclosure provide an authentication system for a multiuser device. The authentication system for the multiuser device may include a security infrastructure and/or a security application that is installed on the multiuser device. In some aspects, the security infrastructure may configure and provide the multiuser device with the security application. The security application may be configured to enable utilization of cryptographic keys, a biometric unit, and/or a TPM device by (an operating system of) the multiuser device to enable secure authentication for access to data stored in a local storage on the multiuser device. As discussed below in further detail, the security application may utilize respective cryptographic keys, the biometric unit, and/or the TPM device to encrypt respective local folders associated with the respective multiple users of the multiuser device. In an example, the security application may authenticate and provide access to a first user associated with first private data stored in a first local storage based at least in part on utilizing first cryptographic keys, the biometric unit, and/or the TPM device. Similarly, the security application may authenticate and provide access to a second user associated with second private data stored in a second local storage based at least in part on utilizing second cryptographic keys, the biometric unit, and/or the TPM device. In this way, the security application may avoid the first user from accessing the second private data stored in the second local storage via the first user's access to the multiuser device, thereby preventing the second private data from becoming compromised. Similarly, the security application may avoid the second user from accessing the first private data stored in the first local storage via the second user's access to the multiuser device, thereby preventing the first private data from becoming compromised. As a result, the security application may enable protection of integrity associated with the first private data and/or the second private data, thereby enabling the multiuser device and/or the DSSP to efficiently expend resources (e.g., management resources, memory resources, computational/processing resources, power consumption resources, system bandwidth, network resources, financial resources, time resources, etc.) to perform suitable tasks associated with providing the cyber security services.

In some aspects, a processor executing the security application may decrypt, based at least in part on utilizing a master key, an assigned private key associated with the user device; decrypt, based at least in part on utilizing a trusted key, a double-encrypted symmetric key to determine a single-encrypted symmetric key; decrypt, based at least in part on utilizing the assigned private key, the single-encrypted symmetric key to determine a symmetric key; and decrypt, based at least in part on utilizing the symmetric key, an encrypted folder stored on the user device to provide access to data included in the encrypted folder.

FIG. 2 is an illustration of an example flow 200 associated with an authentication system for a multiuser device, according to various aspects of the present disclosure. The example flow 200 may include a multiuser device 102 obtaining cyber security services from a security infrastructure (e.g., security infrastructure 110). In some aspects, obtaining the cyber security services may include receiving a configured security application 104 from the security infrastructure for enabling secure authentication for access to data stored in a local storage on the multiuser device 102. As discussed above with respect to FIG. 1, the multiuser device 102 may include the security application 104, a biometric unit 106 (not shown), and a TPM device 108.

In some aspects, the stateless infrastructure 110 may configure and provide the security application 104 to be installed on the multiuser device 102. The security application 104 may enable the multiuser device 102 to receive information to be processed by the security application 104 and/or by the stateless infrastructure 110. The security application 104 may include a graphical interface to receive the information via a local input interface (e.g., touch screen, keyboard, mouse, pointer, etc.) associated with the multiuser device 102. The information may be received via text input or via a selection from among a plurality of options (e.g., pull down menu, etc.). In some aspects, the security application 104 may activate and/or enable, at a time associated with the registration (e.g., after the registration), the graphical interface for receiving the information. For instance, the security application 104 may cause a screen (e.g., local screen) associated with the multiuser device 102 to display, for example, a pop-up message to request entry of the information. Further, the security application 104 may enable transmission of at least a portion of the information to the stateless infrastructure 110.

The multiuser device 102 may receive data storage and protection services from a DSSP (e.g., DSSP 116). As part of the data storage and protection services, the DSSP may enable the multiuser device to synchronize cloud storages with respective local storages (e.g., local folders) on the multiuser device such that the data stored in the cloud storages is also stored in the respective local storages. In this case, upon synchronization, multiple users with authorized access to the multiuser device may access the data stored in the respective local storages when, for example, the multiuser device is unable to connect to the Internet or a server associated with the cloud storage may be out of service.

As discussed below, the security application 104 may utilize respective cryptographic keys, the biometric unit 106, and/or the TPM device 108 to encrypt respective local folders associated with the respective multiple users. In an example, the security application 104 may authenticate and provide access to a first user associated with first private data stored in an encrypted first local folder based at least in part on utilizing first cryptographic keys, the biometric unit 106, and/or the TPM device 108. Similarly, the security application 104 may authenticate and provide access to a second user associated with second private data stored in an encrypted second local folder based at least in part on utilizing second cryptographic keys, the biometric unit 106, and/or the TPM device 108. In some aspects, the first cryptographic keys may be different with respect to the second cryptographic keys.

As shown by reference numeral 210, the security application 104 may receive respective registration information associated with registering respective accounts for the multiple users having authorized access to the multiuser device 102. In an example, the security application 104 may register a first account associated with the first user having authorized access to the multiuser device 102. In some aspects, during registration of the first account, the security application 104 may receive first registration information such as, for example, identity of the first user, a phone number associated with the first user, an email address associated with the first user, or a combination thereof.

Similarly, the security application 104 may register a second account associated with the second user having authorized access to the multiuser device 102. In some aspects, during registration of the second account, the security application 104 may receive second registration information such as, for example, identity of the second user, a phone number associated with the second user, an email address associated with the second user, or a combination thereof.

As shown by reference numeral 220, the security application 104 may determine respective cryptographic keys for the registered account. In an example, the security application 104 may determine and assign a unique first asymmetric assigned key pair to the first account. In some aspects, the security application 104 may utilize a key derivation function to determine the first assigned key pair. The first assigned key pair may be specific to the first account and may include a first assigned public key and first assigned private key. The first assigned public key and the first assigned private key may be associated with each other via, for example, a mathematical function. As a result, data encrypted using the first assigned public key may be decrypted by utilizing the first assigned private key.

Further, the security application 104 may request and receive a first master string of alphanumeric characters from the first user. In some aspects, the first master string may be unique and be associated with the first account. Based at least in part on receiving the first master string, the security application 104 may determine a first master key. In some aspects, the security application 104 may utilize a password derivation function and/or a key derivation function to determine the first master key based at least in part on the first master string. The password derivation function and/or the key derivation function may perform hashing of the first master string to determine the first master key. The security application 104 may utilize the first master key to encrypt the first assigned private key associated with the first account.

Similarly, the security application 104 may determine and assign a unique second asymmetric assigned key pair to the second account. In some aspects, the security application 104 may utilize a key derivation function to determine the second assigned key pair. The second assigned key pair may be specific to the second account and may include a second assigned public key and second assigned private key. The second assigned public key and the second assigned private key may be associated with each other via, for example, a mathematical function. As a result, data encrypted using the second assigned public key may be decrypted by utilizing the second assigned private key.

Further, the security application 104 may request and receive a second master string of alphanumeric characters from the second user. In some aspects, the second master string may be unique and be associated with the second account. Based at least in part on receiving the second master string, the security application 104 may determine a second master key. In some aspects, the security application 104 may utilize a password derivation function and/or a key derivation function to determine the second master key based at least in part on the second master string. The password derivation function and/or the key derivation function may perform hashing of the second master string to determine the second master key. The security application 104 may utilize the second master key to encrypt the second assigned private key associated with the second account.

The security application 104 may also determine a first symmetric key associated with the first account. In some aspects, the security application 104 may utilize a random bit generator to determine the first symmetric key. As a result, the first symmetric key may be a random key including a sequence of unpredictable and unbiased information. The security application 104 may utilize the first symmetric key to encrypt the first local folder, stored in a memory (e.g., memory 630) associated with the multiuser device.

Similarly, the security application 104 may determine a second symmetric key associated with the second account. In some aspects, the security application 104 may utilize the random bit generator to determine the second symmetric key. As a result, the second symmetric key may be a random key including a sequence of unpredictable and unbiased information. The security application 104 may utilize the second symmetric key to encrypt the second local folder, stored in the memory (e.g., memory 630) associated with the multiuser device.

As shown by reference numeral 230, the security application 104 may utilize an operating system being utilized by the multiuser device 102 to associate verification of biometric information with operation of the TPM device 108. In some aspects, the security application 104 may determine availability of the biometric unit 106 and of the TPM device 108. To determine availability of the biometric unit 106 and of the TPM device 108, the security application 104 may request and receive, from the operating system, information indicating that the biometric unit 106 and of the TPM device 108 are associated with the operating system.

Based at least in part on determining availability of the biometric unit 106 and of the TPM device 108, the security application 104 may enable utilization of the biometric unit 106 and/or the TPM device 108 to enable authentication for access to a local storage. In an example, the security application 104 may associate verification of biometric information with encrypting of data by the TPM device 108 and/or with decrypting of data by the TPM device 108. The associating of verification of biometric information with operation of the TPM device 108 may be such that a request for the TPM device 108 to encrypt data and/or to decrypt data is to indicate a result of a successful verification of biometric information.

To associate verification of biometric information with operation of the TPM device 108, the security application 104 may, for example, display a pop-up message on a screen associated with the multiuser device 102 to request biometric information from an authorized user of the multiuser device 102. In this case, the security application 104 may request first biometric information from the first user associated with the first account and second biometric information from the second user associated with the second account. Further, the security application 104 may enable (e.g., cause) the operating system to activate the biometric unit 106 to sense the biometric information. The security application 104 may correlate and store, in the associated memory, the biometric information that belongs to the authorized user as authentic biometric information. In an example, the security application 104 may determine a first correlation between the first biometric information and the first account, and may store the first correlation in the associated memory as authentic first biometric information. Similarly, the security application 104 may determine a second correlation between the second biometric information and the second account, and may store the second correlation in the associated memory as authentic second biometric information.

When the security application 104 is to transmit a request for the TPM device 108 to encrypt data and/or to decrypt data, the security application 104 may verify biometric information in real time. In an example, to verify the biometric information, the security application 104 may enable (e.g., cause) the operating system to activate the biometric unit 106 to receive biometric information in real time (e.g., at a time associated with transmitting the request). Further, the security application 104 may compare the received biometric information with the authentic biometric information stored in the associated memory. When the received biometric information matches (e.g., is the same as) the stored authentic biometric information (e.g., successful authentication), the security application 104 may determine that the received biometric information belongs to the authorized user and may select to transmit the request for the TPM device to encrypt data and/or decrypt data. In some aspects, the request may include and/or indicate a result of the received biometric information matching the authentic biometric information to the TPM device 108. Alternatively, when the received biometric information fails to match (e.g., is different from) the stored authentic biometric information (e.g., unsuccessful authentication), the security application 104 may determine that the received biometric information does not belong to the authorized user and may select to refrain from transmitting the request for the TPM device to encrypt data and/or to decrypt data.

In an example, when the security application 104 is to transmit a request for the TPM device 108 to encrypt data and/or decrypt data associated with the first account, the security application 104 may verify the first biometric information in real time (e.g., at a time associated with transmitting the request), as discussed above. Similarly, when the security application 104 is to transmit a request for the TPM device 108 to encrypt data and/or decrypt data associated with the second account, the security application 104 may verify the second biometric information in real time (e.g., at a time associated with transmitting the request), as discussed above.

As shown by reference numeral 240, the security application may request the TPM device 108 to determine trusted keys. In an example, for the first account, the security application 104 may request the TPM device 108 to determine a first trusted key. In some aspects, the first trusted key may include a first trusted symmetric key. In some aspects, the first trusted key may include a first trusted key pair, including a first trusted public key and a first trusted private key. The first trusted public key and the first trusted private key may be associated with each other via, for example, a mathematical function. As a result, data encrypted using the first trusted public key may be decrypted by utilizing the first trusted private key. In some aspects, the TPM device 108 may retain possession of the first trusted key (e.g., the TPM device 108 may keep the first trusted key confidential).

Based at least in part on determining the first trusted key, the TPM device 108 may return to the security application 104 a unique first identifier associated with (e.g., that identifies) the first trusted key. In some aspects, the first trusted key and/or the first identifier may be specific to (e.g., may be utilized by) the security application 104 and/or to the multiuser device 102.

Similarly, for the second account, the security application 104 may request the TPM device 108 to determine a second trusted key. In some aspects, the second trusted key may include a second trusted symmetric key. In some aspects, the second trusted key may include a second trusted key pair, including a second trusted public key and a second trusted private key. The second trusted public key and the second trusted private key may be associated with each other via, for example, a mathematical function. As a result, data encrypted using the second trusted public key may be decrypted by utilizing the second trusted private key. In some aspects, the TPM device 108 may retain possession of the second trusted key (e.g., the TPM device 108 may keep the second trusted key confidential). Based at least in part on determining the second trusted key, the TPM device 108 may return to the security application 104 a unique second identifier associated with (e.g., that identifies) the second trusted key. In some aspects, the second trusted key and/or the second identifier may be specific to (e.g., may be utilized by) the security application 104 and/or to the multiuser device 102.

As shown by reference numeral 250, the security application 104 may secure the local folders. As discussed above, the security application 104 may utilize the first symmetric key to encrypt the first local folder. To further secure the first local folder, the security application 104 may encrypt the first symmetric key based at least in part on utilizing the first assigned public key, which is associated with the first user and/or the first account, to determine a single-encrypted first symmetric key.

Also, the security application 104 may transmit a first encryption request for the TPM device 108 to encrypt the single-encrypted first symmetric key based at least in part on utilizing the first trusted key to determine a double-encrypted first symmetric key. The first encryption request may include the unique first identifier in association with the single-encrypted first symmetric key to indicate to the TPM device 108 that the single-encrypted first symmetric key is to be encrypted based at least in part on utilizing the first trusted key that is associated with (e.g., identified by) the unique first identifier.

The first encryption request may also include and/or indicate a result of the security application 104 verifying biometric information. In an example, the security application 104 may receive and verify biometric information in real time (e.g., while transmitting the first encryption request), as discussed elsewhere herein. When received biometric information matches the stored authentic first biometric information, the security application 104 may determine that the received biometric information belongs to the first user associated with the first local storage folder, and may select to transmit the first encryption request. Further, the first encryption request may include and/or indicate the result of the successful verification of the received biometric information.

Based at least in part on receiving the first encryption request, the TPM device 108 may determine, from the included and/or indicated result of the successful verification, that the received biometric information matches the stored authentic first biometric information. Further, the TPM device 108 may determine that the single-encrypted first symmetric key is to be encrypted by utilizing the first trusted key associated with the unique first identifier, as indicated by the first encryption request. As a result, the TPM device 108 may utilize the first trusted key to encrypt the single-encrypted first symmetric key.

When the first trusted key includes the first trusted symmetric key, the TPM device 108 may utilize the first trusted symmetric key to encrypt the single-encrypted first symmetric key. When the first trusted key includes the first trusted key pair, the TPM device 108 may encrypt the single-encrypted first symmetric key by utilizing the first trusted public key to determine the double-encrypted first symmetric key. In some aspects, the TPM device 108 may provide the double-encrypted first symmetric key to the security application 104.

The security application 104 may store the double-encrypted first symmetric key in a memory (e.g., memory 630) associated with the multiuser device 102. Because the first trusted key is associated with the TPM device 108, utilizing the first trusted key to encrypt the single-encrypted first symmetric key renders the first local folder device-specific such that data stored in the first local folder may be accessed and/or decrypted by using the multiuser device 102.

Similarly, as discussed above, the security application 104 may utilize the second symmetric key to encrypt the second local folder. To further secure the second local folder, the security application 104 may encrypt the second symmetric key based at least in part on utilizing the second assigned public key, which is associated with the second user and/or the second account, to determine a single-encrypted second symmetric key.

Also, the security application 104 may transmit a second encryption request for the TPM device 108 to encrypt the single-encrypted second symmetric key based at least in part on utilizing the second trusted key to determine a double-encrypted second symmetric key. The second encryption request may include the unique second identifier in association with the single-encrypted second symmetric key to indicate to the TPM device 108 that the single-encrypted second symmetric key is to be encrypted based at least in part on utilizing the second trusted key that is associated with (e.g., identified by) the unique second identifier.

The second encryption request may also include and/or indicate a result of the security application 104 verifying biometric information. In an example, the security application 104 may receive and verify biometric information in real time (e.g., while transmitting the second encryption request), as discussed elsewhere herein. When received biometric information matches the stored authentic second biometric information, the security application 104 may determine that the received biometric information belongs to the second user associated with the second local storage folder, and may select to transmit the second encryption request. Further, the second encryption request may include and/or indicate the result of the successful verification of the received biometric information.

Based at least in part on receiving the second encryption request, the TPM device 108 may determine, from the included and/or indicated result of the successful verification, that the received biometric information matches the stored authentic second biometric information. Further, the TPM device 108 may determine that the single-encrypted second symmetric key is to be encrypted by utilizing the second trusted key associated with the unique second identifier, as indicated by the second encryption request. As a result, the TPM device 108 may utilize the second trusted key to encrypt the single-encrypted second symmetric key.

When the second trusted key includes the second trusted symmetric key, the TPM device 108 may utilize the second trusted symmetric key to encrypt the single-encrypted second symmetric key. When the second trusted key includes the second trusted key pair, the TPM device 108 may encrypt the single-encrypted second symmetric key by utilizing the second trusted public key to determine the double-encrypted second symmetric key.

In some aspects, the TPM device 108 may provide the double-encrypted second symmetric key to the security application 104. The security application 104 may store the double-encrypted second symmetric key in the memory (e.g., memory 630) associated with the multiuser device 102. Because the second trusted public key is associated with the TPM device 108, utilizing the second trusted public key to encrypt the single-encrypted second symmetric key renders the second local folder device-specific such that data stored in the second local folder may be accessed and/or decrypted by using the multiuser device 102.

As shown by reference numeral 260, the security application 104 may enable secure authentication for access to data stored in the local folders. In some aspects, the security application 104 may receive a master string. The security application 104 may determine which folder is sought to be accessed based at least in part on the received master string. In an example, based at least in part on receiving the first master string, the security application 104 may determine that the data stored in the first local folder is to be accessed. Alternatively, based at least in part on receiving the second master string, the security application may determine that the data stored in the second local folder is to be accessed.

When data stored in the first local folder is to be accessed and the security application 104 receives the first master string, the security application 104 may determine the first master key based at least in part on utilizing the first master string. The security application 104 may decrypt the first assigned private key based at least in part on utilizing the first master key.

Further, the security application 104 may transmit a first decryption request for the TPM device 108 to decrypt the double-encrypted first symmetric key based at least in part on utilizing the first trusted key. The first decryption request may include the unique first identifier (and/or the first trusted public key) in association with the double-encrypted first symmetric key to indicate to the TPM device 108 that the double-encrypted first symmetric key is to be decrypted based at least in part on utilizing the first trusted key that is associated with (e.g., identified by) the unique identifier (and/or the first trusted public key).

The first decryption request may also include and/or indicate a result of the security application 104 verifying the first biometric information. In an example, the security application 104 may receive and verify biometric information in real time (e.g., while transmitting the first decryption request), as discussed elsewhere herein. When the received biometric information matches the stored authentic first biometric information, the security application 104 may determine that the received biometric information belongs to the first user associated with the first local folder, and may select to transmit the first decryption request.

Based at least in part on receiving the first decryption request, the TPM device 108 may determine, from the included and/or indicated result of the successful verification, that the received biometric information matches the stored authentic first biometric information. Further, the TPM device 108 may determine that the double-encrypted first symmetric key is to be decrypted using the first trusted key associated with the unique first identifier (and/or the first trusted public key), as indicated by the first decryption request. As a result, the TPM device 108 may decrypt the double-encrypted first symmetric key based at least in part on utilizing the first trusted key.

When the first trusted key includes the first trusted symmetric key, the TPM device 108 may utilize the first trusted symmetric key to decrypt the double-encrypted first symmetric key. When the first trusted key includes the first trusted key pair, the TPM device 108 may utilize the first trusted private key to decrypt the double-encrypted first symmetric key. In some aspects, the TPM device 108 may provide the single-encrypted first symmetric key, determined based at least in part on decrypting the double-encrypted first symmetric key, to the security application 104.

The security application 104 may utilize the first assigned private key to decrypt the single-encrypted symmetric key to determine the first symmetric key. The security application 104 may utilize the first symmetric key to decrypt the first local folder, thereby enabling access to the data stored in the first local folder. In this way, the security application 104 may securely authenticate the first user and provide access to data stored in the first local folder.

Similarly, when data stored in the second local folder is to be accessed and the security application 104 receives the second master string, the security application 104 may determine the second master key based at least in part on utilizing the second master string. The security application 104 may decrypt the second assigned private key based at least in part on utilizing the second master key.

Further, the security application 104 may transmit a second decryption request for the TPM device 108 to decrypt the double-encrypted second symmetric key based at least in part on utilizing the second trusted key. The second decryption request may include the unique second identifier (and/or the second trusted public key) in association with the double-encrypted second symmetric key to indicate to the TPM device 108 that the double-encrypted second symmetric key is to be decrypted based at least in part on utilizing the second trusted key that is associated with (e.g., identified by) the unique identifier (and/or the second trusted public key).

The second decryption request may also include and/or indicate a result of the security application 104 verifying the second biometric information. In an example, the security application 104 may receive and verify biometric information in real time (e.g., while transmitting the second decryption request), as discussed elsewhere herein. When the received biometric information matches the stored authentic second biometric information, the security application 104 may determine that the received biometric information belongs to the second user associated with the second local storage folder, and may select to transmit the second decryption request.

Based at least in part on receiving the second decryption request, the TPM device 108 may determine, from the included and/or indicated result of the successful verification, that the received biometric information matches the stored authentic second biometric information. Further, the TPM device 108 may determine that the double-encrypted second symmetric key is to be decrypted using the second trusted key associated with the unique second identifier (and/or the second trusted public key), as indicated by the second decryption request. As a result, the TPM device 108 may decrypt the double-encrypted second symmetric key based at least in part on utilizing the second trusted key.

When the second trusted key includes the second trusted symmetric key, the TPM device 108 may utilize the second trusted symmetric key to decrypt the double-encrypted second symmetric key. When the second trusted key includes the second trusted key pair, the TPM device 108 may utilize the second trusted private key to decrypt the double-encrypted second symmetric key. In some aspects, the TPM device 108 may provide the single-encrypted second symmetric key, determined based at least in part on decrypting the double-encrypted second symmetric key, to the security application 104.

The security application 104 may utilize the second assigned private key to decrypt the single-encrypted symmetric key to determine the second symmetric key. The security application 104 may utilize the second symmetric key to decrypt the second local folder, thereby enabling access to the data stored in the second local folder. In this way, the security application 104 may securely authenticate the second user and provide access to data stored in the second local folder.

Through secure authentication based at least in part on utilizing respective cryptographic keys, a biometric unit (e.g., biometric information), and/or a TPM device to encrypt and/or to decrypt respective local folders associated with the respective multiple users of a multiuser device, the security application may avoid a first user from accessing second private data (associated with a second user) via the first user's access to the multiuser device, thereby preventing the second private data from becoming compromised. Similarly, the security application may avoid a second user from accessing first private data (associated with the first user) via the second user's access to the multiuser device, thereby preventing the first private data from becoming compromised. As a result, the security application may enable protection of integrity associated with the first private data and/or the second private data, and enable the multiuser device and/or the DSSP to efficiently expend resources (e.g., management resources, memory resources, computational/processing resources, power consumption resources, system bandwidth, network resources, financial resources, time resources, etc.) to perform suitable tasks associated with providing the cyber security services.

As indicated above, FIG. 2 is provided as an example. Other examples may differ from what is described with regard to FIG. 2.

FIG. 3 is an illustration of an example process 300 associated with an authentication system for a multiuser device, according to various aspects of the present disclosure. In some aspects, the process 300 may be performed by a memory and/or a processor/controller (e.g., processor 620) associated with a user device (e.g., multiuser device 102) executing a security application. As shown by reference numeral 310, process 300 may include decrypting, by a user device based at least in part on utilizing a master key, an assigned private key associated with the user device. For instance, the user device may utilize the associated processor/controller to decrypt, based at least in part on utilizing a master key, an assigned private key associated with the user device, as discussed elsewhere herein.

As shown by reference numeral 320, process 300 may include decrypting, by a user device based at least in part on utilizing a trusted key, a double-encrypted symmetric key to determine a single-encrypted symmetric key. For instance, the user device may utilize the associated processor/controller to decrypt, based at least in part on utilizing a trusted key, a double-encrypted symmetric key to determine a single-encrypted symmetric key, as discussed elsewhere herein.

As shown by reference numeral 330, process 300 may include decrypting, by the user device based at least in part on utilizing the assigned private key, the single-encrypted symmetric key to determine a symmetric key. For instance, the user device may utilize the associated processor/controller to decrypt, based at least in part on utilizing the assigned private key, the single-encrypted symmetric key to determine a symmetric key, as discussed elsewhere herein.

As shown by reference numeral 340, process 300 may include decrypting, by the user device based at least in part on utilizing the symmetric key, an encrypted folder stored on the user device to provide access to data included in the encrypted folder. For instance, the user device may utilize the associated processor/controller to decrypt, based at least in part on utilizing the symmetric key, an encrypted folder stored on the user device to provide access to data included in the encrypted folder, as discussed elsewhere herein.

Process 300 may include additional aspects, such as any single aspect or any combination of aspects described below and/or in connection with one or more other processes described elsewhere herein.

In a first aspect, in process 300, decrypting the double-encrypted symmetric key includes verifying biometric information associated with the encrypted folder.

In a second aspect, alone or in combination with the first aspect, in process 300, decrypting the double-encrypted symmetric key includes causing a biometric unit, associated with the user device, to receive biometric information, and comparing the received biometric information with stored authentic biometric information.

In a third aspect, alone or in combination with the first through second aspects, in process 300, decrypting the double-encrypted symmetric key includes a processor associated with the user device transmitting a request to a trusted device associated with the user device, the request indicating that the double-encrypted symmetric key is to be decrypted based at least in part on utilizing the trusted key.

In a fourth aspect, alone or in combination with the first through third aspects, in process 300, decrypting the double-encrypted symmetric key includes a processor associated with the user device transmitting a request to a trusted device associated with the user device, the request indicating successful verification of biometric information associated with the encrypted folder.

In a fifth aspect, alone or in combination with the first through fourth aspects, process 300 includes associating decryption of the double-encrypted symmetric key with verification of biometric information associated with the encrypted folder.

In a sixth aspect, alone or in combination with the first through fifth aspects, process 300 includes determining the master key based at least in part on receiving a master string associated with the encrypted folder.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with an authentication system for a multiuser device, according to various aspects of the present disclosure. In some aspects, the process 400 may be performed by a memory and/or a processor/controller (e.g., processor 620) associated with a user device (e.g., multiuser device 102) executing a security application. As shown by reference numeral 410, process 400 may include encrypting, by a user device based at least in part on utilizing a symmetric key, a folder stored on the user device. For instance, the user device may utilize the associated memory and processor to encrypt, based at least in part on utilizing a symmetric key, a folder stored on the user device, as discussed elsewhere herein.

As shown by reference numeral 420, process 400 may include encrypting, by the user device based at least in part on utilizing an assigned public key associated with the user device, the symmetric key to determine a single-encrypted symmetric key. For instance, the user device may utilize the associated memory and processor to encrypt, based at least in part on utilizing an assigned public key associated with the user device, the symmetric key to determine a single-encrypted symmetric key, as discussed elsewhere herein.

As shown by reference numeral 430, process 400 may include encrypting, by the user device based at least in part on utilizing a trusted key specific to the user device, the first-encrypted symmetric key to determine a double-encrypted symmetric key. For instance, the user device may utilize the associated memory and processor to encrypt, based at least in part on utilizing a trusted key specific to the user device, the first-encrypted symmetric key to determine a double-encrypted symmetric key, as discussed elsewhere herein.

As shown by reference numeral 440, process 400 may include storing, by user device, the double-encrypted symmetric key in an associated memory. For instance, the user device may utilize the associated memory and processor to store the double-encrypted symmetric key in an associated memory, as discussed elsewhere herein.

Process 400 may include additional aspects, such as any single aspect or any combination of aspects described below and/or in connection with one or more other processes described elsewhere herein.

In a first aspect, in process 400, encrypting the single-encrypted symmetric key includes verifying biometric information associated with the folder.

In a second aspect, alone or in combination with the first aspect, in process 400, encrypting the single-encrypted symmetric key includes causing a biometric unit, associated with the user device, to receive biometric information, and comparing the received biometric information with stored authentic biometric information.

In a third aspect, alone or in combination with the first through second aspects, in process 400, encrypting the single-encrypted symmetric key includes transmitting a request to a trusted device associated with the user device, the request indicating that the single-encrypted symmetric key is to be encrypted based at least in part on utilizing the trusted key.

In a fourth aspect, alone or in combination with the first through third aspects, in process 400, encrypting the single-encrypted symmetric key includes transmitting a request to a trusted device associated with the user device, the request indicating successful verification of biometric information associated with the folder.

In a fifth aspect, alone or in combination with the first through fourth aspects, process 400 includes associating encryption of the single-encrypted symmetric key with verification of biometric information associated with the folder.

In a sixth aspect, alone or in combination with the first through fifth aspects, process 400 includes determining a master key to encrypt an assigned private key associated with the assigned public key.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with an authentication system for a multiuser device, according to various aspects of the present disclosure. In some aspects, the process 500 may be performed by a memory and/or a processor/controller (e.g., processor 620) associated with a user device (e.g., multiuser device 102) executing a security application. As shown by reference numeral 510, process 500 may include encrypting, by a multiuser device, a first folder based at least in part on utilizing a first symmetric key and a second folder based at least in part on utilizing a second symmetric key, the first folder and the second folder being stored on the multiuser device. For instance, the user device may utilize the associated memory and processor to encrypt a first folder based at least in part on utilizing a first symmetric key and a second folder based at least in part on utilizing a second symmetric key, the first folder and the second folder being stored on the multiuser device, as discussed elsewhere herein.

As shown by reference numeral 520, process 500 may include encrypting, by the multiuser device, the first symmetric key based at least in part on utilizing a first trusted key and the second symmetric key based at least in part on utilizing a second trusted key. For instance, the user device may utilize the associated memory and processor to encrypt the first symmetric key based at least in part on utilizing a first trusted key and the second symmetric key based at least in part on utilizing a second trusted key, as discussed elsewhere herein.

As shown by reference numeral 530, process 500 may include providing access, by the multiuser device, to the encrypted first folder by decrypting the encrypted first symmetric key based at least in part on verifying first biometric information and to the encrypted second folder by decrypting the encrypted second symmetric key based at least in part on verifying second biometric information, the first biometric information being different from the second biometric information. For instance, the user device may utilize the associated memory and processor to provide access to the encrypted first folder by decrypting the encrypted first symmetric key based at least in part on verifying first biometric information and to the encrypted second folder by decrypting the encrypted second symmetric key based at least in part on verifying second biometric information, the first biometric information being different from the second biometric information, as discussed elsewhere herein.

Process 500 may include additional aspects, such as any single aspect or any combination of aspects described below and/or in connection with one or more other processes described elsewhere herein.

In a first aspect, in process 500, decrypting the encrypted first symmetric key includes causing a biometric unit, associated with the multiuser device, to receive the first biometric information, and decrypting the encrypted second symmetric key includes causing the biometric unit to receive the second biometric information.

In a second aspect, alone or in combination with the first aspect, in process 500, decrypting the encrypted first symmetric key includes comparing the first biometric information with authentic first biometric information, and decrypting the encrypted second symmetric key includes comparing the second biometric information with authentic second biometric information.

In a third aspect, alone or in combination with the first through second aspects, in process 500, decrypting the encrypted first symmetric key includes transmitting a first request to a trusted device associated with the multiuser device, the first request indicating that the encrypted first symmetric key is to be decrypted based at least in part on utilizing the first trusted key, and decrypting the encrypted second symmetric key includes transmitting a second request to the trusted device, the second request indicating that the encrypted second symmetric key is to be decrypted based at least in part on utilizing the second trusted key, the first trusted key being different from the second trusted key.

In a fourth aspect, alone or in combination with the first through third aspects, in process 500, decrypting the encrypted first symmetric key includes transmitting a first request to a trusted device associated with the multiuser device, the first request indicating successful verification of the first biometric information, and decrypting the encrypted second symmetric key includes transmitting a second request to the trusted device, the second request indicating successful verification of the second biometric information.

In a fifth aspect, alone or in combination with the first through fourth aspects, in process 500, providing access to the encrypted first folder includes decrypting the encrypted first symmetric key based at least in part on utilizing an assigned private key associated with the multiuser device, and providing access to the encrypted second folder includes decrypting the encrypted second symmetric key based at least in part on utilizing the assigned private key.

In a sixth aspect, alone or in combination with the first through fifth aspects, process 500 may include associating decrypting of the encrypted first symmetric key with verification of the first biometric information, and associating decrypting of the encrypted second symmetric key with verification of the second biometric information.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of example devices 600, according to various aspects of the present disclosure. In some aspects, the example devices 600 may form part of or implement the systems, environments, infrastructures, components, or the like described elsewhere herein and may be used to perform the example processes described elsewhere herein. The example devices 600 may include a universal bus 610 communicatively coupling a processor 620, a memory 630, a storage component 640, an input component 650, an output component 660, and a communication interface 670.

Bus 610 may include a component that permits communication among multiple components of a device 600. Processor 620 may be implemented in hardware, firmware, and/or a combination of hardware and software. Processor 620 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 620 may include one or more processors capable of being programmed to perform a function. Memory 630 may include a random access memory (RAM), a read only memory (ROM), and/or another type of dynamic or static storage device (e.g., a flash memory, a magnetic memory, and/or an optical memory) that stores information and/or instructions for use by processor 620.

Storage component 640 may store information and/or software related to the operation and use of a device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 may include a component that permits a device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 may include a component that provides output information from device 600 (via, for example, a display, a speaker, a haptic feedback component, an audio or visual indicator, and/or the like).

Communication interface 670 may include a transceiver-like component (e.g., a transceiver, a separate receiver, a separate transmitter, and/or the like) that enables a device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

A device 600 may perform one or more processes described elsewhere herein. A device 600 may perform these processes based on processor 620 executing software instructions stored by a non-transitory computer-readable medium, such as memory 630 and/or storage component 640. As used herein, the term "computer-readable medium" may refer to a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 6 are provided as an example. In practice, a device 600 may include additional components, fewer components, different components, or differently arranged components than those shown in FIG. 6. Additionally, or alternatively, a set of components (e.g., one or more components) of a device 600 may perform one or more functions described as being performed by another set of components of a device 600.

As indicated above, FIG. 6 is provided as an example. Other examples may differ from what is described with regard to FIG. 6.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   identifying, by a user device based at least in part on receiving a master string, an encrypted folder from among a plurality of encrypted folders locally-stored on the user device;
   determining, by the user device, a master key based at least in part on the master string;
   decrypting, by the user device based at least in part on utilizing the master key, an assigned private key associated with the user device;
   decrypting, by the user device based at least in part on utilizing a trusted key that is determined by a trusted device included in the user device, a double-encrypted symmetric key to determine a single-encrypted symmetric key;
   decrypting, by the user device based at least in part on utilizing the assigned private key, the single-encrypted symmetric key to determine a symmetric key; and
   decrypting, by the user device based at least in part on utilizing the symmetric key, the identified encrypted folder locally-stored on the user device to provide access to data included in the identified encrypted folder.

2. The method of claim 1, wherein decrypting the double-encrypted symmetric key includes verifying biometric information associated with the identified encrypted folder.

3. The method of claim 1, wherein decrypting the double-encrypted symmetric key includes causing a biometric unit, associated with the user device, to receive biometric information, and comparing the received biometric information with stored authentic biometric information.

4. The method of claim 1, wherein decrypting the double-encrypted symmetric key includes transmitting a request to the trusted device associated with the user device, the request indicating that the double-encrypted symmetric key is to be decrypted based at least in part on utilizing the trusted key.

5. The method of claim 1, wherein decrypting the double-encrypted symmetric key includes transmitting a request to the trusted device associated with the user device, the request indicating successful verification of biometric information associated with the identified encrypted folder.

6. The method of claim 1, further comprising:
associating decryption of the double-encrypted symmetric key with verification of biometric information associated with the identified encrypted folder.

7. The method of claim 1, wherein the plurality of encrypted folders locally-stored on the user device include the identified encrypted folder to be decrypted based at least in part on utilizing the master string and another encrypted folder to be decrypted based at least in part on utilizing another master string.

8. A user device, comprising:
a memory; and
a processor communicatively coupled to the memory, the memory and the processor being configured to:
identify, based at least in part on receiving a master string, an encrypted folder from among a plurality of encrypted folders locally-stored on the user device;
determine a master key based at least in part on the master string;
decrypt, based at least in part on utilizing the master key, an assigned private key associated with the user device;
decrypt, based at least in part on utilizing a trusted key that is determined by a trusted device associated with the user device, a double-encrypted symmetric key to determine a single-encrypted symmetric key;
decrypt, based at least in part on utilizing the assigned private key, the single-encrypted symmetric key to determine a symmetric key; and
decrypt, based at least in part on utilizing the symmetric key, the identified encrypted folder locally-stored on the user device to provide access to data included in the identified encrypted folder.

9. The user device of claim 8, wherein, to decrypt the double-encrypted symmetric key, the memory and the processor are configured to verify biometric information associated with the identified encrypted folder.

10. The user device of claim 8, wherein, to decrypt the double-encrypted symmetric key, the memory and the processor are configured to cause a biometric unit, associated with the user device, to receive biometric information, and to compare the received biometric information with stored authentic biometric information.

11. The user device of claim 8, wherein, to decrypt the double-encrypted symmetric key, the memory and the processor are configured to transmit a request to the trusted device associated with the user device, the request indicating that the double-encrypted symmetric key is to be decrypted based at least in part on utilizing the trusted key.

12. The user device of claim 8, wherein, to decrypt the double-encrypted symmetric key, the memory and the processor are configured to transmit a request to the trusted device associated with the user device, the request indicating successful verification of biometric information associated with the identified encrypted folder.

13. The user device of claim 8, wherein the memory and the processor are configured to associate decryption of the double-encrypted symmetric key with verification of biometric information associated with the identified encrypted folder.

14. A non-transitory computer-readable medium configured to store instructions, which when executed by a processor associated with a user device, configure the processor to:
identify, based at least in part on receiving a master string, an encrypted folder from among a plurality of encrypted folders locally-stored on the user device;
determine a master key based at least in part on the master string;
decrypt, based at least in part on utilizing the master key, an assigned private key associated with the user device;
decrypt, based at least in part on utilizing a trusted key that is determined by a trusted device included in the user device, a double-encrypted symmetric key to determine a single-encrypted symmetric key;
decrypt, based at least in part on utilizing the assigned private key, the single-encrypted symmetric key to determine a symmetric key; and
decrypt, based at least in part on utilizing the symmetric key, the identified encrypted folder locally-stored on the user device to provide access to data included in the identified encrypted folder.

15. The non-transitory computer-readable medium of claim 14, wherein, to decrypt the double-encrypted symmetric key, the processor is configured to verify biometric information associated with the identified encrypted folder.

16. The non-transitory computer-readable medium of claim 14, wherein, to decrypt the double-encrypted symmetric key, the processor is configured to cause a biometric unit, associated with the user device, to receive biometric information, and to compare the received biometric information with stored authentic biometric information.

17. The non-transitory computer-readable medium of claim 14, wherein, to decrypt the double-encrypted symmetric key, the processor is configured to transmit a request to the trusted device associated with the user device, the request indicating that the double-encrypted symmetric key is to be decrypted based at least in part on utilizing the trusted key.

18. The non-transitory computer-readable medium of claim 14, wherein, to decrypt the double-encrypted symmetric key, the processor is configured to transmit a request to the trusted device associated with the user device, the request indicating successful verification of biometric information associated with the identified encrypted folder.

19. The non-transitory computer-readable medium of claim 14, wherein the processor is configured to associate decryption of the double-encrypted symmetric key with verification of biometric information associated with the identified encrypted folder.

\* \* \* \* \*